(12) United States Patent
Horvath et al.

(10) Patent No.: US 10,160,518 B2
(45) Date of Patent: Dec. 25, 2018

(54) PORTABLE BUOYANT PLATFORM

(71) Applicants: Kirsty Horvath, Blacktown (AU); Sunny Horvath, Blacktown (AU)

(72) Inventors: Kirsty Horvath, Blacktown (AU); Sunny Horvath, Blacktown (AU)

( * ) Notice: Subject to any disclaimer, the term of this patent is extended or adjusted under 35 U.S.C. 154(b) by 0 days.

(21) Appl. No.: 15/485,609

(22) Filed: Apr. 12, 2017

(65) Prior Publication Data
US 2017/0291663 A1 Oct. 12, 2017

(30) Foreign Application Priority Data

Apr. 12, 2016 (AU) ................................. 2016901361
Jan. 9, 2017 (AU) ................................. 2017200134

(51) Int. Cl.
| | |
|---|---|
| *B63B 7/04* | (2006.01) |
| *A47J 36/34* | (2006.01) |
| *A45C 11/00* | (2006.01) |
| *A45C 9/00* | (2006.01) |
| *A47J 37/06* | (2006.01) |
| *A47G 23/02* | (2006.01) |

(52) U.S. Cl.
CPC ................. *B63B 7/04* (2013.01); *A45C 9/00* (2013.01); *A45C 11/00* (2013.01); *A47J 36/34* (2013.01); *A47J 37/0664* (2013.01); *A47G 23/02* (2013.01); *A47G 2200/02* (2013.01)

(58) Field of Classification Search
CPC .................................. B63B 7/04; B63B 22/00
See application file for complete search history.

(56) References Cited

U.S. PATENT DOCUMENTS

| | | | |
|---|---|---|---|
| 4,020,584 A | | 5/1977 | Michel |
| 5,251,113 A | * | 10/1993 | Wagoner ................ A01K 79/02 362/190 |
| 5,324,221 A | * | 6/1994 | Kaufman ............. A61H 37/005 441/129 |
| 6,045,423 A | | 4/2000 | Silvia |
| 7,025,418 B1 | | 4/2006 | Hackal |
| 8,210,887 B2 | * | 7/2012 | Dixon ....................... B63B 1/04 441/13 |

(Continued)

FOREIGN PATENT DOCUMENTS

FR 2997632 A1 5/2014

*Primary Examiner* — Stephen P Avila
(74) *Attorney, Agent, or Firm* — Kilpatrick Townsend & Stockton

(57) ABSTRACT

Disclosed is a portable platform with a plurality of panels configured to have a folded state and an extended state, wherein the platform is buoyant in water. The platform is configured to provide a substantially horizontal surface above a water surface when in the extended state and placed in a body of water. A first one of the plurality of panels is a support panel that may include a heat resistant support plate on which a barbecue or stove may be placed and/or secured. A second one of the plurality of panels has an aperture configured such that the barbecue fits through the aperture when the platform is in the folded state. A third one of the plurality of panels that is a cover panel that enables the platform to enclose the barbecue when in the folded state. The cover panel may have a heat resistant protective plate and the protective plate on the cover panel may have a recess to accommodate the barbecue when the platform is in the folded state.

19 Claims, 4 Drawing Sheets

(56) References Cited

U.S. PATENT DOCUMENTS

| | | |
|---|---|---|
| 9,771,132 B1* | 9/2017 | Bashawaty ............. B63B 35/73 |
| 2006/0162637 A1 | 7/2006 | Schmitt |
| 2007/0095337 A1* | 5/2007 | Mosher, II ................ F24C 3/14 |
| | | 126/25 R |
| 2009/0242570 A1 | 10/2009 | Churchill et al. |
| 2011/0073031 A1 | 3/2011 | Dixon |
| 2011/0119986 A1 | 5/2011 | Sellers |
| 2012/0260840 A1* | 10/2012 | Fletcher ................ A01M 31/06 |
| | | 114/264 |
| 2014/0110413 A1 | 4/2014 | Kelly et al. |

* cited by examiner

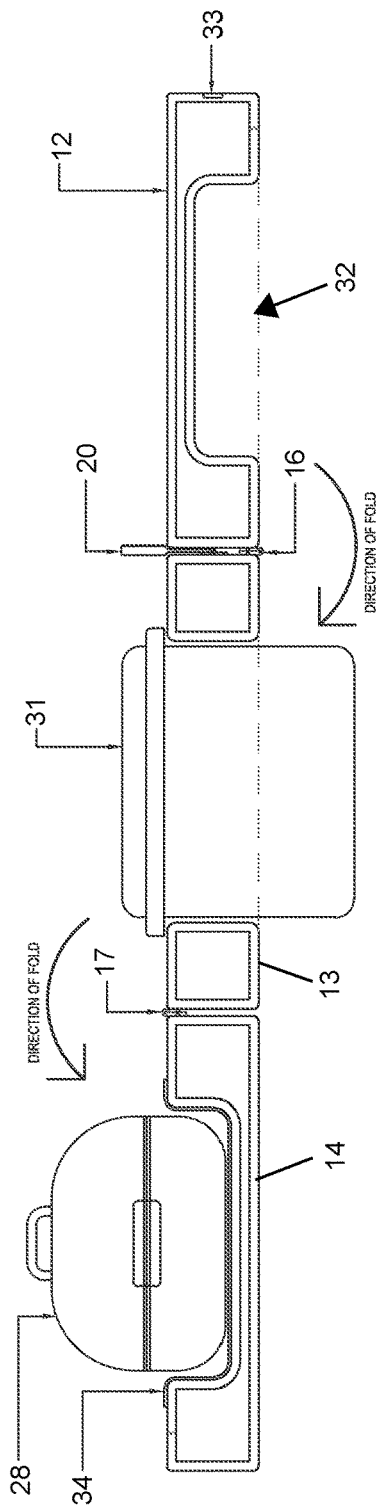
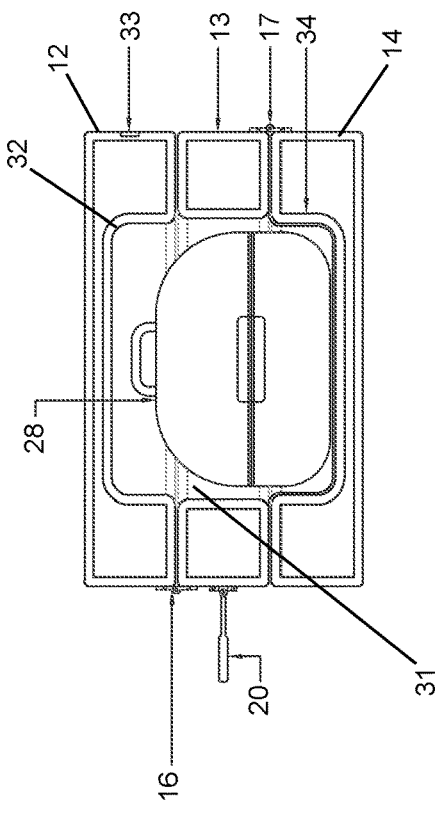
Figure 6
Figure 7

PORTABLE BUOYANT PLATFORM

PREVIOUS APPLICATION DATA

The present application claims priority from Australian Provisional Patent Application No. 2016901361 and Australian Patent Application No. 2017200134, the contents of which are hereby incorporated by reference in their entirety.

TECHNICAL FIELD

The present invention generally relates to a buoyant platform that is portable and suitable for supporting various items, such as but not limited to a barbeque or small stove.

BACKGROUND

Various types of portable barbecues or stoves are known. These are generally standalone items that can be transported to a particular location and setup on the ground, a table or some other suitable surface. Care must be taken when choosing a location to set up a barbecue to ensure that the heat from the barbecue does not damage the surface. Further, food splashes are another factor to consider that may damage or stain the nearby surface.

Portable tables and similar devices are also known, however these are generally designed separately to a portable barbecue. While some may be suitable for use with a small barbecue, they are not often designed specifically for this purpose, with the barbecue typically having its own support structure and the table being designed simply for preparation and/or consumption of food.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

SUMMARY

According to one aspect of the present invention, there is provided a portable platform, including a plurality of panels configured to have a folded state and an extended state, wherein the platform is buoyant in water.

In one form, the platform is configured to provide a substantially horizontal surface above a water surface when in the extended state and placed in a body of water. Advantageously, a first one of the plurality of panels is a support panel that may include a heat resistant support plate on which a barbecue or stove may be placed and/or secured.

In accordance with another optional embodiment, provided by way of example only, a second one of the plurality of panels includes an aperture configured such that the barbecue fits through the aperture when the platform is in the folded state. Preferably, the platform further includes a third one of the plurality of panels that is a cover panel that enables the platform to enclose the barbecue when in the folded state.

In other example forms: the cover panel includes a heat resistant protective plate; and the protective plate on the cover panel includes a recess to accommodate the barbecue when the platform is in the folded state.

In yet another example form, a cooler may be provided that is configured to couple with or fit within the aperture when the platform is in the extended state.

In still further particular, but non-limiting, example forms, there are three panels each hingedly connected to at least one adjacent panel; the panels include buoyant material enclosed within an outer skin; the platform further includes a handle that can be used to move the platform between the folded and extended states; the platform further includes a locking device to retain the platform in the folded state; and the platform further includes a cup holder and/or other apertures for securing items.

In still further particular, but non-limiting, example forms: the platform further includes an anchor component to anchor the platform to the bed of a water body; and the anchor component can be enclosed within the platform when it is in the folded state.

In one example form, the three panels fold back on to themselves in a concertina fashion, to completely enclose a barbecue, so that the platform can then be carried like a suitcase using a handle.

Advantageously, the platform includes everything needed for a barbecue picnic on the platform, so that it is never necessary to leave the water. This enables a person to be in the water whilst enjoying a beverage and cooking on a barbecue. Such a platform could be used at a river, lake, lagoon, stream, calm bay or even in a pool.

Preferably, the platform could also be taken onto a boat, transported to a destination, and when ready for lunch, pull up at a sand bar, unload the platform and enjoy cooking on a barbecue on the platform. Afterwards, the platform can then be folded up and placed back onto the boat.

BRIEF DESCRIPTION OF FIGURES

Example embodiments should become apparent from the following description, which is given by way of example only, of at least one preferred but non-limiting embodiment, described in connection with the accompanying figures, wherein:

FIG. 6 illustrates a cross sectional end view of the preferred embodiment in the extended state; and FIG. 7 illustrates a cross sectional end view of the preferred embodiment in the folded state.

DETAILED DESCRIPTION

Figure 1:
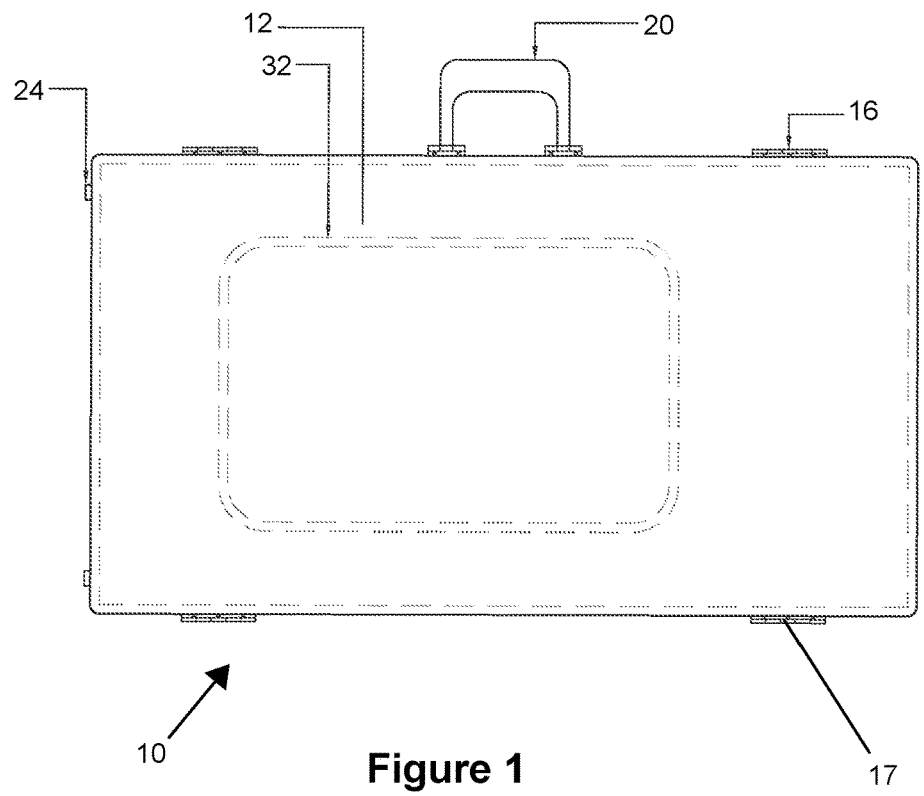
FIG. 1 illustrates a plan view of a preferred embodiment of the invention in a folded state.

The following modes, given by way of example only, are described in order to provide a more precise understanding of the subject matter of a preferred embodiment or embodiments.

In the Figures, incorporated to illustrate features of an example embodiment, like reference numerals are used to identify like parts throughout the Figures.

Referring to FIG. 1, a platform 10 according to a preferred embodiment of the invention is shown in a folded state.

Figure 2:
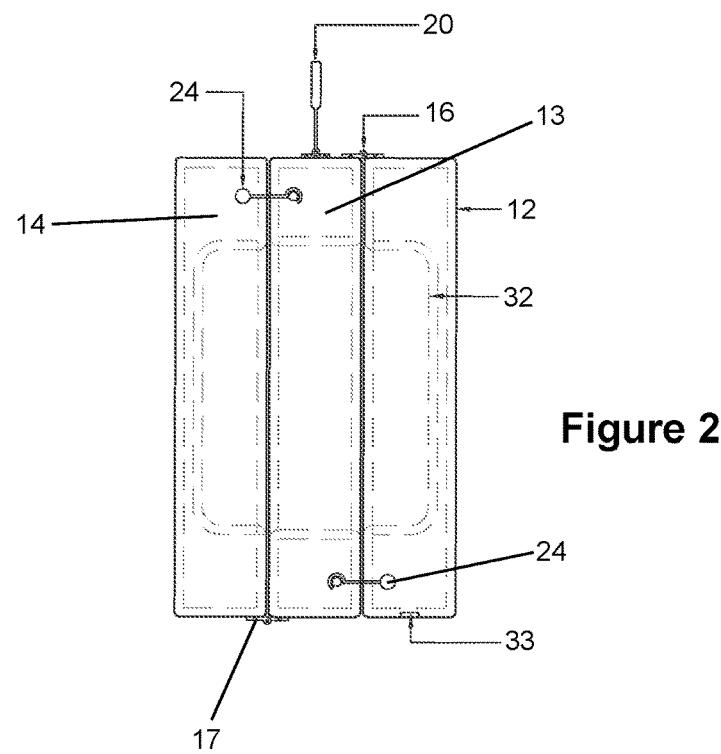
FIG. 2 illustrates an end view of the preferred embodiment in the folded state.
Figure 3:
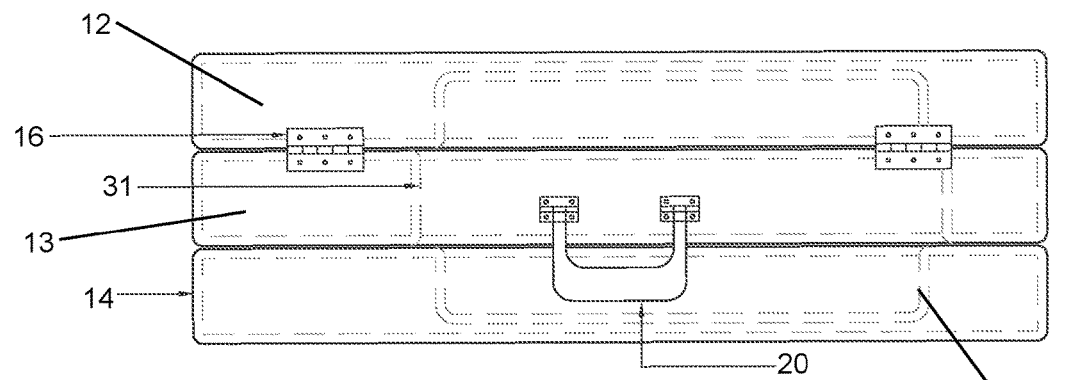
FIG. 3 illustrates a front view of the preferred embodiment in the folded state.
Figure 4:
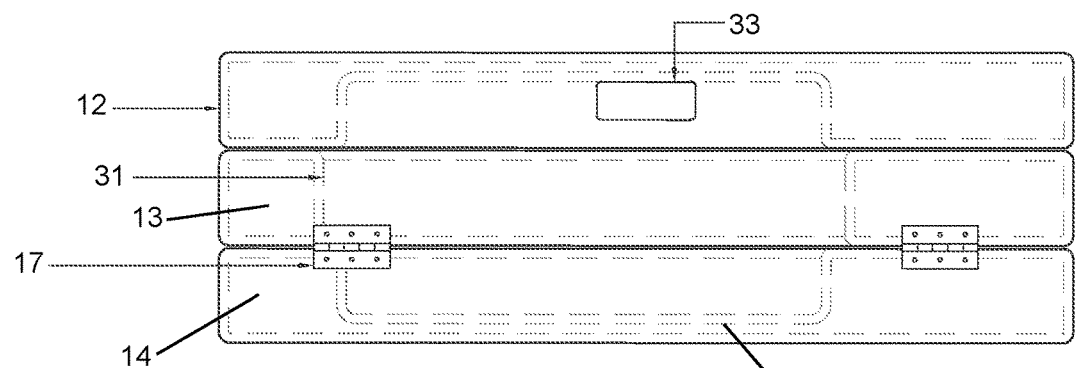
FIG. 4 illustrates a rear view of the preferred embodiment in the folded state.

Referring to FIG. 2, the platform 10 includes a cover panel 12, a middle panel 13 and a support panel 14. The cover panel 12 and the middle panel 13 are connected by hinges 16, while the middle panel 13 and the support panel 14 are also connected by hinges 17 at the opposite edge of the middle panel 13.

The folded state of the platform 10, as shown in FIGS. 1 to 4, allows the platform 10 to be easily transported.

FIGS. 1 and 2 also show that the platform 10 includes a handle 20 connected to the middle panel 13. Further, there are hooks 24 on the cover panel 12 and the support panel 14 that can be connected to the middle panel 13 to prevent the platform 10 inadvertently unfolding while the platform 10 is being carried by the handle 20 or being moved in some other way.

Figure 5:
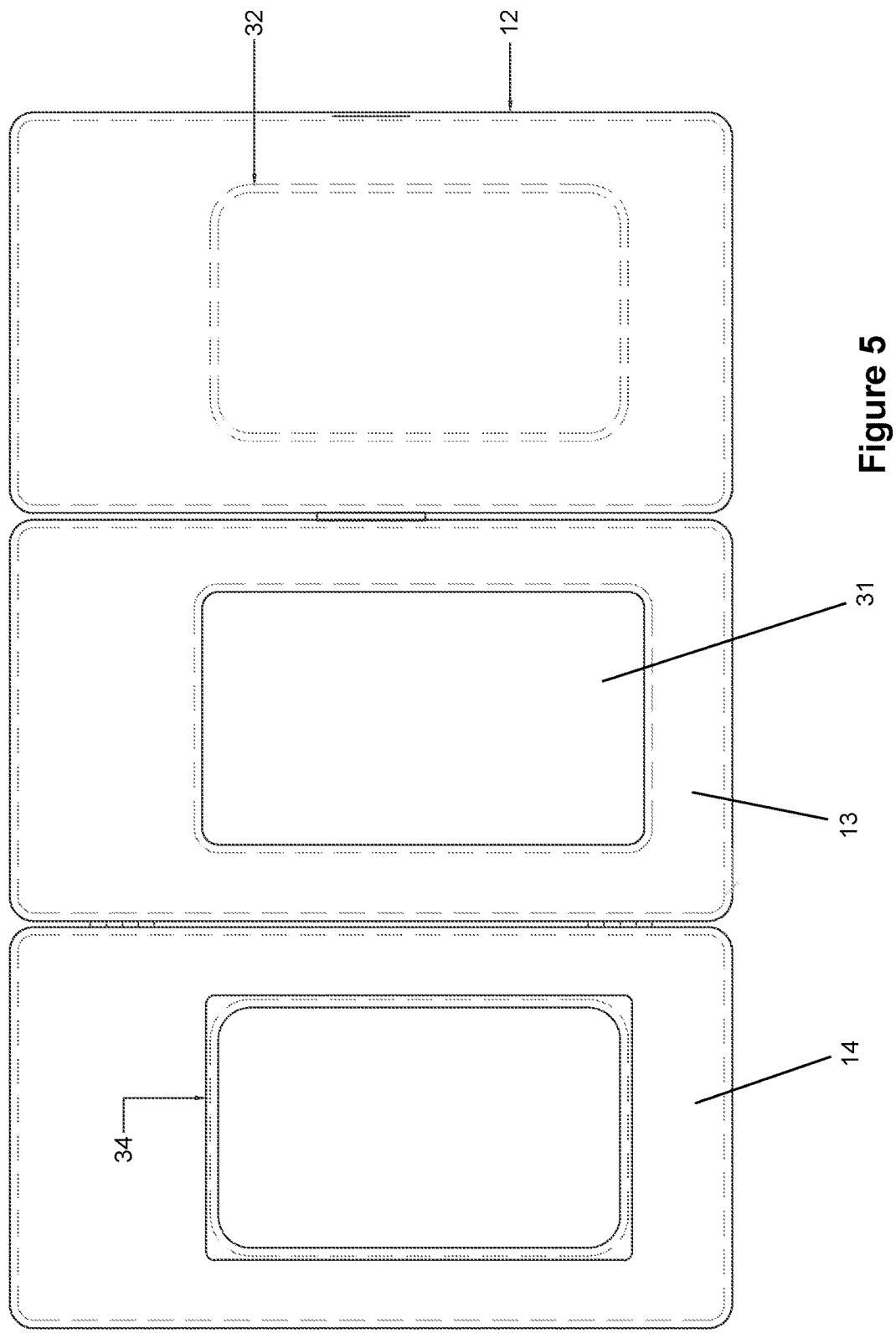
FIG. 5 illustrates a plan view of the preferred embodiment in an extended state.

Referring to FIGS. 6 and 7, the platform 10 is adapted to contain or support a stove or barbecue 28. The barbecue 28 sits on the support panel 14, while the middle panel 13 includes a hole 31 (see FIG. 5) that is shaped to accommodate the barbecue 28 when the platform 10 is in the folded state.

The inside of the cover panel 12 includes an indentation 32, also designed to accommodate the barbecue 28 when the platform 10 is in the folded state. Optionally, a protective plate may be provided to line the indentation 32 that is heat resistant, so that residual heat from the barbecue 28 will not damage the cover panel 12 or other parts of the platform 10 when folded after use.

The support panel 14 includes a support plate 34 on which the barbecue 28 sits (see FIG. 6). The support plate 34 is also heat resistant so that no damage occurs to the support panel 14 or any other part of the platform 10 from heat created during use of the barbecue 28.

In some embodiments the barbecue 28 may be fixed, however in the preferred embodiment it simply sits on the support plate 34. The barbecue 28 in alternative embodiments include extendable legs, however the barbecue 28 shown in the figures does not include this feature.

The first step of moving the platform 10 from the folded state to an extended state involves laying the platform 10 so that the support panel 14 is on the bottom, then lifting the cover panel 12 using the hand hold 33 so that it pivots about the hinges 16. The opposite side of the cover panel 12 can also be lifted using the handle 20, thereby also pivoting the middle panel 13 about the hinges 17.

The cover panel 12 can continue to be moved across and down to the flat position as shown in FIG. 6. The handle 20 is long enough that it protrudes from between the cover panel 12 and the middle panel 13 even when fully extended, so it can be used to lower the cover panel 12 all the way down to the fully extended state.

Referring to FIG. 7, the platform 10 folds to a compact state so that it is easily transported. FIG. 6 shows the platform 10 in use, where it forms a table that floats on water, ideal for camping and recreational activities at lakes, calm rivers and the like. The hole 31 serves the additional purpose of retaining another floating item, such as a portable cooler or ice box, as also shown in FIG. 6.

The preferred embodiment of the platform 10 is a fold up picnic table with a barbecue 28 as illustrated in the figures. It floats on water during use and can accommodate a range of other items in addition to the barbecue 28. It is a portable, collapsible, floating table with built in barbecue 28, which can be used at a range of aquatic locations including lakes and rivers. The platform 10, however, may be provided without the barbecue 28, providing a table on which a barbecue can be placed if desired.

The preferred embodiment shown in the figures has dimensions for the three panels of 900 mm in length, 500 mm in width and 75 mm in thickness. It will be appreciated, however, that various embodiments with different dimensions will be possible and are considered to fall within the scope of the invention. Alternative embodiments may have only two panels or may have more than three panels.

Each panel of the preferred embodiment is constructed using a plastic shell with hollow interior. An alternative embodiment, however, may use aluminium to construct a frame and sheets of aluminium for surfaces within the frame, with a substantially hollow interior. The panels are sealed so that no water can reach the hollow interior, regardless of the panel orientation or any water splashed onto the panels.

In another alternative embodiment, each panel is constructed from 75 mm thick expanded polystyrene (EPS) insulation material, covered with aluminium sheets on either side. Yet another alternative embodiment, however, may use a foam core with a UV stabilised PVC plastic sheet on either side. It will be appreciated that many other alternative materials may also be used to form the panels and are also considered to fall within the scope of the invention.

By enclosing the panels in the way as described above and shown in FIGS. 6 and 7, it ensures that water splashing onto the surface of the platform during use will not cause the platform to sink. Such water will simply run off, with the only way of sinking the platform being to place too many items on the surface.

Pegs with ropes may be used to secure the platform 10 when in use. The ropes may be connected to the hooks 24 or alternative attachment points, such as at each corner of the platform 10 when in the extended state. The pegs can he inserted into the bed of a river or other water body, or attached to the ground on the shore, as the particular situation may require, thereby securing the platform 10 in a particular location and preventing it from floating downstream or drifting due to wind, for example.

The preferred embodiment allows for different depths of water, ranging at least from 300 mm to 1 mm, however alternative embodiments and/or locations may allow the platform 10 to be used in depths of water outside this range.

One or more cup holders may also be provided, which are not shown in the preferred embodiment but are an optional feature and may be included in alternative embodiments. The cup holders if provided can be recessed into one or more of the panels 12, 13, 14.

A hole in one of the panels for an umbrella to go through and anchor into the sand is also an optional inclusion. Yet another optional feature of the cover panel 12 is a preparation and food storage area, possibly including a hinged food cover net.

In the foregoing description of preferred embodiments, specific terminology has been resorted to for the sake of clarity. However, the invention is not intended to be limited to the specific terms so selected, and it is to he understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

Many modifications will be apparent to those skilled in the art without departing from the scope of the present invention.

The invention claimed is:

1. A portable platform, comprising a plurality of panels configured to have a folded state and an extended state, a first one of the plurality of panels being a support panel that comprises a heat resistant support plate on which a barbecue or stove may be placed and/or secured, and a second one of the plurality of panels comprising an aperture extending through the panel and being configured such that the barbecue fits through the aperture when the platform is in the folded state, wherein the platform is buoyant in water and is configured to provide a substantially horizontal surface above a water surface when in the extended state and placed in a body of water, and wherein the aperture is configured so that a cooler can couple with or fit within or extend through the aperture when the platform is in the extended state.

2. The platform according to claim 1, comprising a third one of the plurality of panels that is a cover panel that enables the platform to enclose the barbecue when in the folded state.

3. The platform according to claim 2, wherein the cover panel comprises a heat resistant protective plate.

4. The platform according to claim 3, wherein the protective plate on the cover panel comprises a recess to accommodate the barbecue when the platform is in the folded state.

5. The platform according to claim 1, wherein there are three panels each hingedly connected to at least one adjacent panel.

6. The platform according to claim 1, further comprising an anchor component to anchor the platform to the bed of a water body.

7. The platform according to claim 6, wherein the anchor component can be enclosed within the platform when it is in the folded state.

8. The platform according to claim 1, further comprising a cup holder.

9. The platform according to claim 1, further comprising a handle that can be used to move the platform between the folded and extended states.

10. The platform according to claim 1, further comprising a locking device to retain the platform in the folded state.

11. The platform according to claim 1, wherein the panels comprise buoyant material enclosed within an outer skin.

12. The platform according to claim 1, wherein the panels comprise an outer skin with a hollow interior.

13. A portable platform that is buoyant in water, comprising a plurality of panels configured to have a folded state and an extended state, a first one of the plurality of panels being a support panel that comprises a heat resistant support plate on which a barbecue or stove may be placed and/or secured, a second one of the plurality of panels comprising an aperture extending through the panel and being configured such that the barbecue fits through the aperture when the platform is in the folded state and a cooler can couple with or fit within or extend through the aperture when the platform is in the extended state, and a third one of the plurality of panels that is a cover panel that enables the platform to enclose the barbecue when in the folded state.

14. The platform according to claim 13, wherein the cover panel comprises a heat resistant protective plate.

15. The platform according to claim 14, wherein the protective plate on the cover panel comprises a recess to accommodate the barbecue when the platform is in the folded state.

16. The platform according to claim 13, further comprising a handle that can be used to move the platform between the folded and extended states.

17. The platform according to claim 13, further comprising a locking device to retain the platform in the folded state.

18. A portable platform, comprising a plurality of panels configured to have a folded state and an extended state, a first one of the plurality of panels being a support panel, a second one of the plurality of panels comprising a central aperture extending through the panel, and a third one of the plurality of panels that is a cover panel that enables the platform to enclose the aperture when in the folded state, wherein the platform is buoyant in water and is configured to provide a substantially horizontal surface above a water surface when in the extended state and placed in a body of water, and wherein the aperture is configured so that a cooler can couple with or fit within or extend through the aperture when the platform is in the extended state.

19. The platform according to claim 18, wherein the support panel comprises a heat resistant support plate on which a barbecue or stove may be placed and/or secured, and the cover panel comprises a heat resistant protective plate, wherein the protective plate on the cover panel comprises a recess to accommodate the barbecue when the platform is in the folded state.

* * * * *